UNITED STATES PATENT OFFICE.

MAX HÖNIG, OF BRÜNN, AUSTRIA-HUNGARY.

TANNING MATERIAL AND METHOD OF MAKING SAME.

1,080,970.

Specification of Letters Patent.      Patented Dec. 9, 1913.

No Drawing.      Application filed March 31, 1910. Serial No. 552,553.

*To all whom it may concern:*

Be it known that I, MAX HÖNIG, a subject of the Emperor of Austria-Hungary, residing at Brünn, in the Empire of Austria-Hungary, have invented certain new and useful Improvements in Tanning Material and Method of Making Same, of which the following is a specification.

This invention relates to a process for the manufacture out of sulfite cellulose waste lyes, of a solid or liquid tanning extract easily soluble in water, with definite tanning properties.

Sulfite cellulose waste lyes, or waste sulfite liquors, result from the prolonged action on wood of sulfite lyes, usually calcium bisulfite lyes, at high temperatures and under pressure. As a result of such action there is found in the waste liquors various compounds of calcium, sulfurous acid of woody constituents, dissolved in the form of calcium salts and esters, such as the calcium salts of organic sulfonic acids or the so-called ligno-sulfonic acids and calcium bisulfite. There may also be present calcium acetate, and sulfonic acid esters of carbohydrates and "pentosans". The use of such sulfite lyes directly for tanning purposes does not give satisfactory results. When used without preliminary treatment the calcium compounds have a bad effect on the skins treated, rendering them flawy and mellow, and also the lyes in neutral or alkaline solution quickly turn the skin dark, probably by oxidation.

As a result of prolonged experiment I have found that the tanning action produced by such lyes is due, not to the calcium salts and combinations which on the contrary are harmful, nor to the free or combined sulfurous acid, but to the sulfonic acid combinations or the ligno-sulfonic acids, and that these organic sulfonic acids should be present partly as free sulfonic acids, and partly as salts of bases which, unlike those of calcium, have no bad action on the leather, such as salts of the alkalis, aluminum or zinc.

The present invention comprises a process of producing such a tanning extract which shall be free from the injurious and harmful constituents of the known extracts, and which shall contain both the above mentioned free organic sulfonic acids and harmless salts of such acids.

In practising the process of the present invention the amount of calcium, and of free and combined volatile acids ($SO_2$, acetic, etc.) is determined in the particular lye to be treated. Sufficient sulfuric acid, or other acid which forms insoluble or difficultly soluble calcium salts, is then added to set free all the volatile acids present and also set free a part of the organic sulfonic acids present as calcium salts. In this reaction the sulfuric acid, being the stronger acid, replaces the weaker acids, setting free such weaker acids, and forming the sulfates, which in the present case are substantially insoluble. The volatile acids thus set free are removed as vapors or gases by distillation or volatilization; the organic sulfonic acids set free remain in solution. A part of the calcium is also thus precipitated as the insoluble calcium sulfate (gypsum).

The sulfuric acid added sets free a part only of the organic sulfonic acids, since the tanning action of the waste sulfite lyes is due to the combined presence of free sulfonic acids and of salts of such sulfonic acids above indicated. There still remains in the solution the remainder of the organic sulfonic acid combinations as calcium salts. It is, however, also desirable to remove the remainder of the calcium from the solution and for this purpose there is added a soluble sulfate of an alkali, aluminum or zinc, or other soluble salt which will react with the calcium combinations to form an insoluble calcium salt, and also form salts of the organic sulfonic acids which do not injuriously affect the leather. If a sulfate is added calcium sulfate is formed, and may be removed as by filtration.

While in the above described process two steps have been described for the sake of clearness, in practice both the acid and salt, such as sulfuric acid and soluble sulfate, may be added at the same time and all the calcium obtained as an insoluble salt at once. Instead of the sulfuric acid mentioned in the above described process other acids and salts which form insoluble calcium salts may be used, such, for instance as oxalic acid and oxalates. The reagents added (acids and salts) should preferably be added while stirring vigorously in order to obtain the calcium salt in as coarse a form as possible. The gypsum or other precipitated calcium salt may be removed in any suitable manner as by means of a filter press.

The reactions which take place in the above described process will be somewhat clearer from the following equations:

Calcium bisulfite and acetate+$H_2SO_4$ = $CaSO_4$(gypsum)+$SO_2$ and acetic acid.
Calcium compounds of organic sulfonic acids + $H_2SO_4$ = $CaSO_4$ + free sulfonic acids.
Calcium compounds of organic sulfonic acids+soluble sulfate of alkali=$CaSO_4$+ alkali compounds of organic sulfonic acids.

The relative amounts of free ligno-sulfonic acid and combined ligno-sulfonic acid in the resulting solution may be controlled as desired and may vary within wide limits. The swelling effect of the extract and the speed with which it penetrates the hide depends upon the relative proportions of free and combined acid, a larger amount of free acid being used for heavy than for light hides.

If, as is frequently the case, the lyes to be treated contain a large proportion of iron, the prepared lyes, freed by filtration from the precipitated calcium salts, before being given their final treatment, are preferably filtered through a tannin containing material, which, as for instance oak galls and myrobalans, has the property of keeping the iron back in an insoluble form, or treated with the said material in some other suitable manner. The lyes thus prepared can not only be evaporated in a vacuum so as to obtain liquid extracts, but can be concentrated to such an extent that, after cooling, they form a solid mass that can be easily rubbed to pieces, which even in cold water can be dissolved to form a perfectly clear, light-brown liquid.

The present invention is further illustrated by the following specific examples of its application: A lye of 6.3° Baumé (1.045 sp. gr.) is found to give on analysis 5.54 gr. CaO per liter, and combined volatile acids, figured as $SO_2$, 1.75 gr, per liter. The amount of $CaSO_4$ per liter was found to correspond to 0.82 gr. CaO. Hence figuring that 1.75 gr. $SO_2$ combines with 1.53 gr. CaO, there is present as $CaSO_4$ and $CaSO_3$ 0.82+1.53=2.35 gr. CaO, and 5.54—2.35=3.19 gr. of CaO are present in combination with the organic non-volatile acids. In order to completely set free the volatile acids ($SO_2$, etc.) and to convert half of the combined non-volatile acids (ligno-sulfonic acids) into the free acids, and half into the sodium salt of such acids, (this proportion having been found to give good results in practice) the following amount of sulfuric acid, on the one hand, and of sodium acid sulfate, ($NaHSO_4$) on the other are used.

1.75 gr. $SO_2$ are equivalent to 2.36 gr. $H_2SO_4$. 3.19 gr. CaO, (combined with the ligno-sulfonic acids) require 6.83 gr. $NaHSO_4$ to convert the calcium salt half into the free acid. (The $NaHSO_4$ corresponds to an equivalent amount of $H_2SO_4$+ $Na_2SO_4$). Accordingly there is added for each cubic meter of lye, 2.36 kg. sulfuric acid and 6.86 kg. of sodium bisulfate. The $SO_2$ is thus set free, the CaO all converted into the insoluble calcium sulfate, and the calcium ligno sulfonates converted into the free sulfonic acids and the sodium salts of such acids. The extract thus obtained is concentrated until a paste is obtained which contains approximately one third liquid and two thirds solid material, and which contains about equal amounts of tanning and non-tanning substances. It is soluble in water and forms a clear solution.

What I claim as my invention and desire to secure by Letters Patent is:—

1. A process for the manufacture of tanning substance from sulfite cellulose waste lyes, consisting in mixing the lyes with an acid which forms insoluble calcium salts in necessary proportion for freeing a portion only of the ligno-sulfonic acids, and adding a soluble salt of said first mentioned acid in the proportion required to convert the remaining calcium salts into other soluble salts and an insoluble calcium salt.

2. A process for the manufacture of tanning substance from sulfite cellulose waste lyes, consisting in mixing the lyes with an acid which forms insoluble calcium salts in necessary proportion for freeing a portion of the ligno-sulfonic acids, and adding a soluble salt of said first mentioned acid in the proportion required to convert the remaining calcium salts into other soluble salts and an insoluble calcium salt then filtering the product through a tanning material which forms insoluble compounds with iron.

3. A process of converting waste sulfite liquor into a useful tanning agent, which comprises reacting upon said liquor with an acid, of which the calcium salt is substantially insoluble, in amount sufficient to decompose a part only of the calcium lignosulfonate therein, and in reacting upon said liquor with a sufficient amount of a soluble salt, containing an acid capable of forming a calcium salt which is substantially insoluble, to convert the remaining soluble calcium into insoluble salts.

4. A process of making a tanning agent from sulfite waste liquor, which comprises reacting upon said liquor with sulfuric acid in amount sufficient to decompose a part only of the calcium ligno-sulfonate therein; and thereafter reacting upon said liquor with a sufficient amount of a solution of a salt of an acid whose calcium salt is insoluble, to decompose the remainder of the calcium ligno-sulfonate.

5. A process of making a tanning agent from sulfite waste liquor, which comprises reacting upon said liquor with sulfuric acid, in amount sufficient to decompose a part only of the alkaline earth ligno-sulfonates therein, and in reacting upon said liquor with an amount of a solution of a soluble sulfate sufficient to decompose the remainder of the alkaline earth ligno-sulfonates.

6. A process of converting waste sulfite liquor into a useful tanning agent, which comprises reacting upon said liquor with an acid of which the calcium salt is substantially insoluble, in amount sufficient to decompose a part only of the alkaline earth ligno-sulfonates in said liquor, and in reacting upon said liquor with a sufficient amount of a soluble salt containing an acid whose calcium salt is substantially insoluble, to decompose the remaining soluble alkaline earth compounds therein, and thereafter removing the soluble iron from said liquor by treating the same with a tannin-containing material.

7. A process of converting waste sulfite liquor into a useful tanning agent, which comprises reacting upon said liquor with an acid of which the alkaline earth salts are substantially insoluble, in amount sufficient to decompose the sulfites, bisulfites, acetates and a part only of the ligno-sulfonates in said liquor, and in reacting upon said liquor with a sufficient amount of a soluble salt containing an acid whose alkaline earth salts are substantially insoluble to convert the remaining soluble alkaline earth metals into insoluble salts, and then filtering said liquor, and concentrating the same.

8. A tanning material containing soluble salts of ligno-sulfonic acid, and free ligno-sulfonic acid, said liquor being substantially free of soluble calcium compounds.

In testimony whereof I affix my signature in presence of two witnesses.

MAX HÖNIG.

Witnesses:
   ALBRECHT VON SEILITZ,
   VICTOR TERRY.